(12) United States Patent
Lin et al.

(10) Patent No.: US 9,465,584 B2
(45) Date of Patent: Oct. 11, 2016

(54) METHOD FOR GENERATING RANDOM NUMBER, MEMORY STORAGE DEVICE AND CONTROL CIRCUIT

(71) Applicant: PHISON ELECTRONICS CORP., Miaoli (TW)

(72) Inventors: Wei Lin, Taipei (TW); Yu-Cheng Hsu, Yilan County (TW); Siu-Tung Lam, Hsinchu (TW)

(73) Assignee: PHISON ELECTRONICS CORP., Miaoli (TW)

( * ) Notice: Subject to any disclaimer, the term of this patent is extended or adjusted under 35 U.S.C. 154(b) by 366 days.

(21) Appl. No.: 14/203,584

(22) Filed: Mar. 11, 2014

(65) Prior Publication Data

US 2015/0193204 A1 Jul. 9, 2015

(30) Foreign Application Priority Data

Jan. 7, 2014 (TW) .............................. 103100554 A (51) Int. Cl.
*G06F 1/02* (2006.01)
*G06F 7/58* (2006.01)

(52) U.S. Cl.
CPC .................................. *G06F 7/588* (2013.01)

(58) Field of Classification Search
CPC ...................................................... G06F 7/588
USPC .................................................. 708/250–256
See application file for complete search history.

(56) References Cited

U.S. PATENT DOCUMENTS

| 2013/0073598 | A1 | 3/2013 | Jacobson et al. |
| 2015/0149701 | A1* | 5/2015 | Lin ........................ G11C 16/32 711/103 |

FOREIGN PATENT DOCUMENTS

TW 201216292 4/2012

OTHER PUBLICATIONS

"Office Action of Taiwan Counterpart Application", issued on Sep. 24, 2015, p. 1-p. 6.

* cited by examiner

*Primary Examiner* — Tan V. Mai
(74) *Attorney, Agent, or Firm* — Jianq Chyun IP Office (57) ABSTRACT

A method for generating a random number, a memory storage device and a control circuit are provided. The method includes: writing data into a plurality of memory cells; reading at least one of the memory cells repeatedly according to a first read voltage to obtain a plurality of sensing currents; and generating the random number according to the sensing currents.

21 Claims, 9 Drawing Sheets

METHOD FOR GENERATING RANDOM NUMBER, MEMORY STORAGE DEVICE AND CONTROL CIRCUIT

CROSS-REFERENCE TO RELATED APPLICATION

This application claims the priority benefit of Taiwan application serial no. 103100554, filed on Jan. 7, 2014. The entirety of the above-mentioned patent application is hereby incorporated by reference herein and made a part of this specification.

BACKGROUND

1. Technical Field

The invention relates a method of generating a random number adapted for a rewritable non-volatile memory module, and a memory storage device and a control circuit using the method.

2. Description of Related Art

The markets of digital cameras, cellular phones, and MP3 players have expanded rapidly in recent years, resulting in escalated demand for storage media by consumers. The characteristics of data non-volatility, low power consumption, and compact size make a rewritable non-volatile memory module (e.g., flash memory) ideal to be built in the portable multi-media devices as cited above.

Use of random numbers is very common and important in some of encryption/description technologies. A standard random number must satisfy principles of being unpredictable, changed over time, and unrepeatable. Generally, the random number is mainly generated by a random number generator. However, with attacking methods being continuously developed, random number generating rules of some random number generators may be cracked by means of data analysis.

Nothing herein should be construed as an admission of knowledge in the prior art of any portion of the present invention. Furthermore, citation or identification of any document in this application is not an admission that such document is available as prior art to the present invention, or that any reference forms a part of the common general knowledge in the art.

SUMMARY

The invention is directed to a method for generating a random number, a memory storage device and a control circuit, capable of generating a random number according to sensing currents being read, such that the generated random number does not have regularity.

The invention provides a method for generating a random number for a rewritable non-volatile memory module, in which the rewritable non-volatile memory module includes a plurality of memory cells, and the method for generating the random number includes: writing data into the memory cells; reading at least one of the memory cells repeatedly according to a first read voltage to obtain a plurality of sensing currents; and generating at least one random number according to the sensing currents.

From another perspective, the invention also provides a memory storage device, and the memory storage device includes a connection interface unit, a rewritable non-volatile memory module and a memory controlling circuit unit. The connection interface unit is configured to couple to a host system. The rewritable non-volatile memory module includes a plurality of memory cells. The memory controlling circuit unit is coupled to the connection interface unit and the rewritable non-volatile memory module. The memory controlling circuit unit is configured to write data into the memory cells. The memory controlling circuit unit is further configured to read at least one of the memory cells repeatedly according to a first read voltage to obtain a plurality of sensing currents. The memory controlling circuit unit is further configured to generate at least one random number according to the sensing currents.

From yet another perspective, the invention also provides a control circuit to control a rewritable non-volatile memory module, the rewritable non-volatile memory module includes a plurality of memory cells, and the control circuit includes an interface and a memory management circuit. The interface is configured to electrically connect the memory cells, a plurality of word line and a plurality of bit lines, in which each of the memory cells is electrically connected to one word line among the word lines and one bit line among the bit lines. The memory management circuit is coupled to the interface, and configured to write data into the memory cells. Therein, the memory management circuit is further configured to read at least one of the memory cells repeatedly according to a first read voltage to obtain a plurality of sensing currents. The memory management circuit is further configured to generate at least one random number according to the sensing currents.

In summary, the method for generating the random number, the memory storage device and the control circuit provided by the invention is capable of reading one or more of the memory cells by utilizing a first read voltage to obtain a plurality of sensing currents corresponding to the first memory cells, and generating the random number according to the sensing currents being obtained, such that such that the generated random number does not have regularity.

To make the above features and advantages of the disclosure more comprehensible, several embodiments accompanied with drawings are described in detail as follows.

It should be understood, however, that this Summary may not contain all of the aspects and embodiments of the present invention, is not meant to be limiting or restrictive in any manner, and that the invention as disclosed herein is and will be understood by those of ordinary skill in the art to encompass obvious improvements and modifications thereto.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

Embodiments of the present invention may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least on of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

Generally, a memory storage device (also known as a memory storage system) includes a rewritable non-volatile memory module and a controller (also known as a control circuit). The memory storage device is usually configured together with a host system so that the host system may write data to or read data from the memory storage device.

Figure 1A:
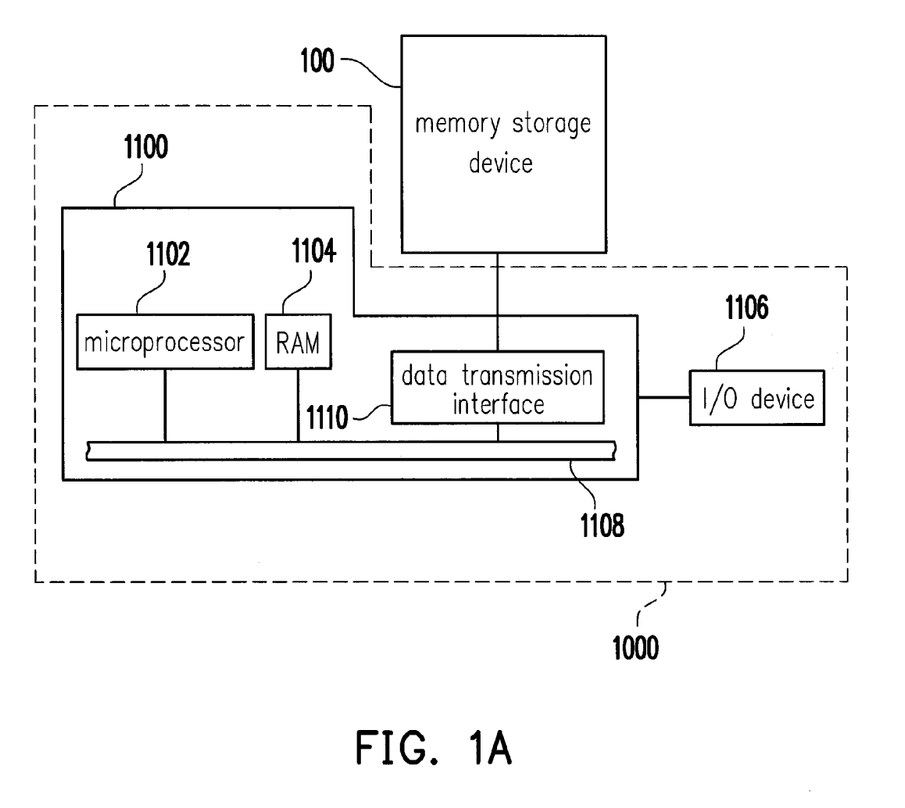
FIG. 1A illustrates a host system and a memory storage device according to an exemplary embodiment.
Figure 1B:
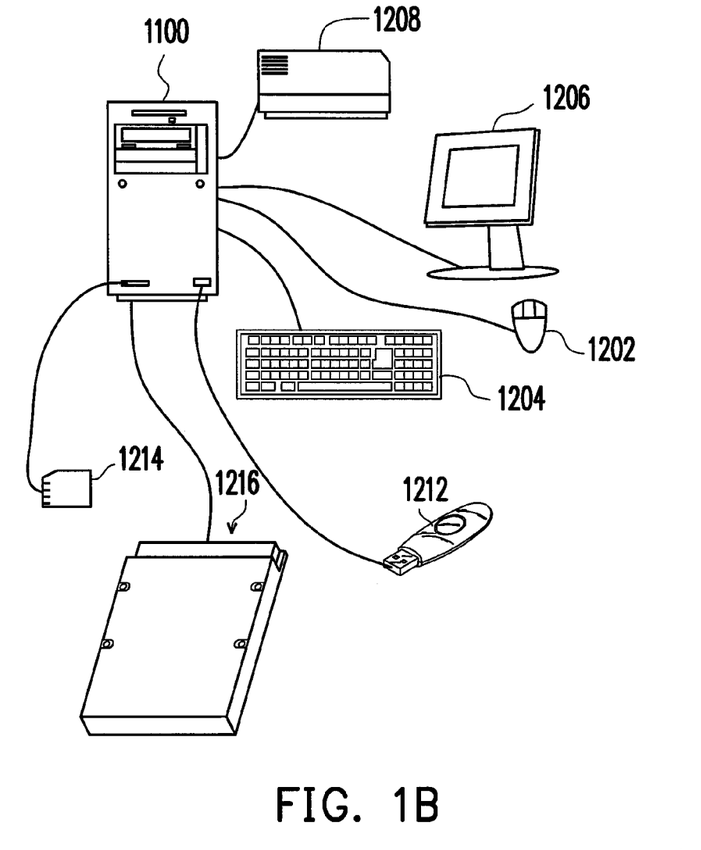
FIG. 1B is a schematic diagram illustrating a computer, an input/output device and a memory storage device according to an exemplary embodiment.
Figure 1C:
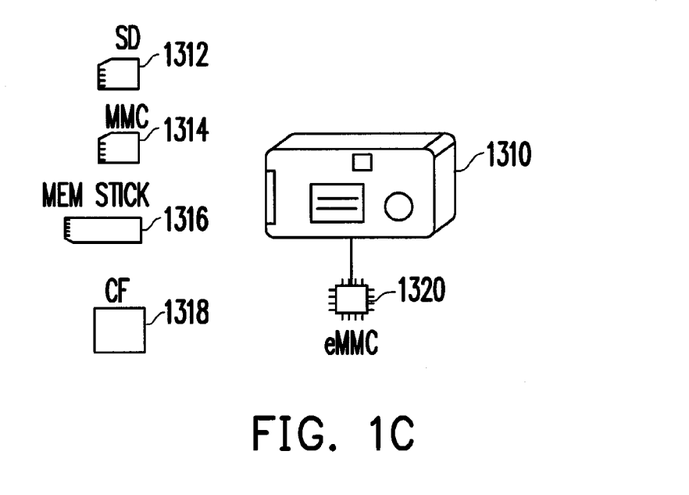
FIG. 1C is a schematic diagram illustrating a host system and a memory storage device according to an exemplary embodiment.

FIG. 1A illustrates a host system and a memory storage device according to an exemplary embodiment. FIG. 1B is a schematic diagram illustrating a computer, an input/output device and a memory storage device according to an exemplary embodiment. FIG. 1C is a schematic diagram illustrating a host system and a memory storage device according to an exemplary embodiment.

Referring to FIG. 1A, a host system 1000 includes a computer 1100 and an input/output (I/O) device 1106. The computer 1100 includes a microprocessor 1102, a random access memory (RAM) 1104, a system bus 1108, and a data transmission interface 1110. The I/O device 1106 includes a mouse 1202, a keyboard 1204, a display 1206 and a printer 1208 as shown in FIG. 1B. It should be understood that the devices illustrated in FIG. 1B are not intended to limit the I/O device 1106, and the I/O device 1106 may further include other devices.

In the present embodiment of the invention, the memory storage device 100 is coupled to other devices of the host system 1000 through the data transmission interface 1110. By using the microprocessor 1102, the random access memory (RAM) 1104 and the Input/Output (I/O) device 1106, data may be written into the memory storage device 100 or may be read from the memory storage device 100. For example, the memory storage device 100 may be a rewritable non-volatile memory storage device such as a flash drive 1212, a memory card 1214, or a solid state drive (SSD) 1216 as shown in FIG. 1B.

Generally, the host system 1000 may substantially be any system capable of storing data with the memory storage device 100. Although the host system 1000 is described as a computer system in the present exemplary embodiment, in another exemplary embodiment of the invention, the host system 1000 may be a digital camera, a video camera, a telecommunication device, an audio player, or a video player. For example, if the host system is a digital camera (video camera) 1310, the rewritable non-volatile memory storage device may be a SD card 1312, a MMC card 1314, a memory stick 1316, a CF card 1318 or an embedded storage device 1320 (as shown in FIG. 1C). The embedded storage device 1320 includes an embedded MMC (eMMC). It should be mentioned that the eMMC is directly coupled to a substrate of the host system.

Figure 2A:
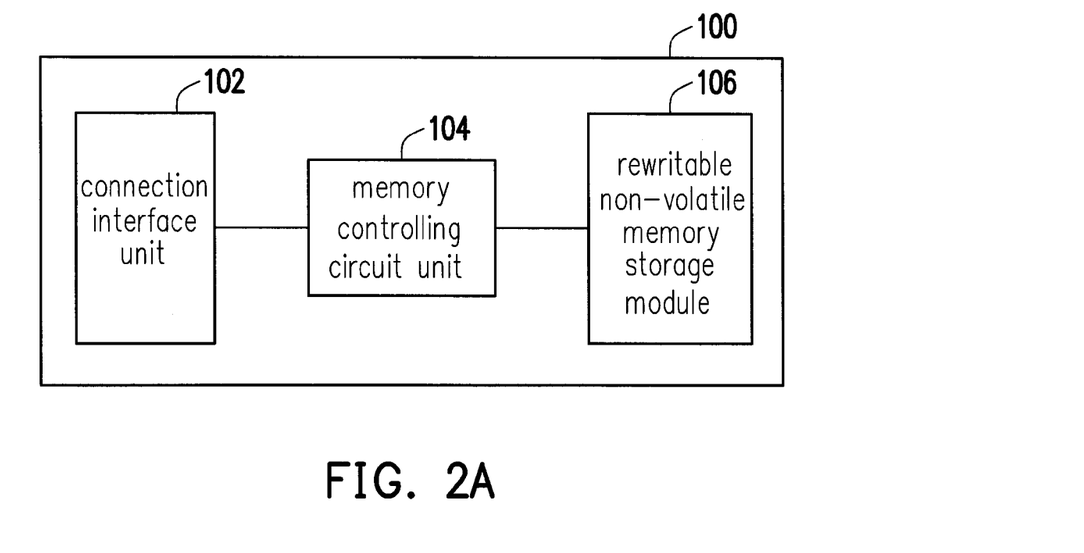
FIG. 2A is a schematic block diagram illustrating the memory storage device depicted in FIG. 1A.

FIG. 2A is a schematic block diagram illustrating the memory storage device depicted in FIG. 1A.

Referring to FIG. 2A, the memory storage device 100 includes a connection interface unit 102, a memory controlling circuit unit 104 and a rewritable non-volatile memory storage module 106.

In the present exemplary embodiment, the connection interface unit 102 is compatible with a serial advanced technology attachment (SATA) standard. However, the invention is not limited thereto, and the connection interface unit 102 may also be compatible with a Parallel Advanced Technology Attachment (PATA) standard, an Institute of Electrical and Electronic Engineers (IEEE) 1394 standard, a peripheral component interconnect (PCI) Express interface standard, a universal serial bus (USB) standard, a secure digital (SD) interface standard, a Ultra High Speed-I (UHS-I) interface standard, a Ultra High Speed-II (UHS-II) interface standard, a memory sick (MS) interface standard, a multi media card (MMC) interface standard, an embedded MMC (eMMC) interface standard, a Universal Flash Storage (UFS) interface standard, a compact flash (CF) interface standard, an integrated device electronics (IDE) interface standard or other suitable standards. The connection interface unit 102 and the memory controlling circuit unit 104 may be packaged into one chip, or the connection interface unit 102 is distributed outside of a chip containing the memory controlling circuit unit 104.

The memory controlling circuit unit 104 is configured to execute a plurality of logic gates or control commands which are implemented in a hardware form or in a firmware form, so as to perform operations of writing, reading or erasing data in the rewritable non-volatile memory storage module 106 according to the commands of the host system 1000.

The rewritable non-volatile memory storage module 106 is coupled to the memory controlling circuit unit 104 and configured to store data written from the host system 1000.

Figure 2B:
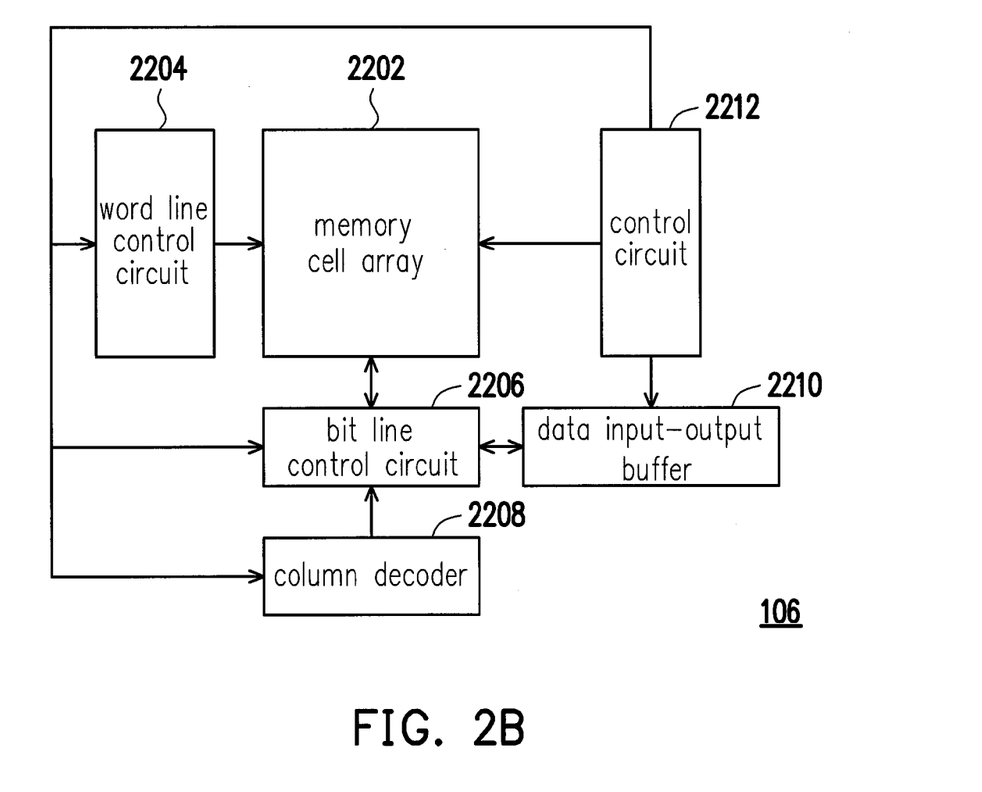
FIG. 2B is a schematic block diagram illustrating a rewritable non-volatile memory module according to an exemplary embodiment.

FIG. 2B is a schematic block diagram illustrating a rewritable non-volatile memory module according to an exemplary embodiment.

Referring to FIG. 2B, the rewritable non-volatile memory module 106 includes a memory cell array 2202, a word line control circuit 2204, a bit line control circuit 2206, a column decoder 2208, a data input-output buffer 2210 and a control circuit 2212.

The memory cell array 2022 includes a plurality of memory cells for storing data. The memory cells are disposed at intersections of a plurality of bit lines and a plurality of word lines in arrays. In case a writing command or a reading command is received from the memory controlling circuit unit 104, the control circuit 2212 controls the word line control circuit 2204, the bit line control circuit 2206, the column decoder 2208, the data input-output buffer 2210 to write the data in the memory cell array 2202 or read the data from the memory cell array 2202. In addition, the word line control circuit 2204 is configured to control voltages applied to the word lines; the bit line control circuit 2206 is configured to control voltages applied to the bit lines; the column decoder 2208 is configured to select the corresponding bit line according to a decoding row address in a command; and the data input-output buffer 2210 is configured to temporarily store the data.

The memory cells in the memory cell array 2022 are divided into a plurality of physical erasing units. The physical erasing units may belong to the same memory die or belong to different memory dies. Take a NAND type flash memory as an example, in which a physical erasing unit includes a plurality of NAND strings. Each of the NAND strings may include a plurality of transistors connected in series with one other.

Figure 3:
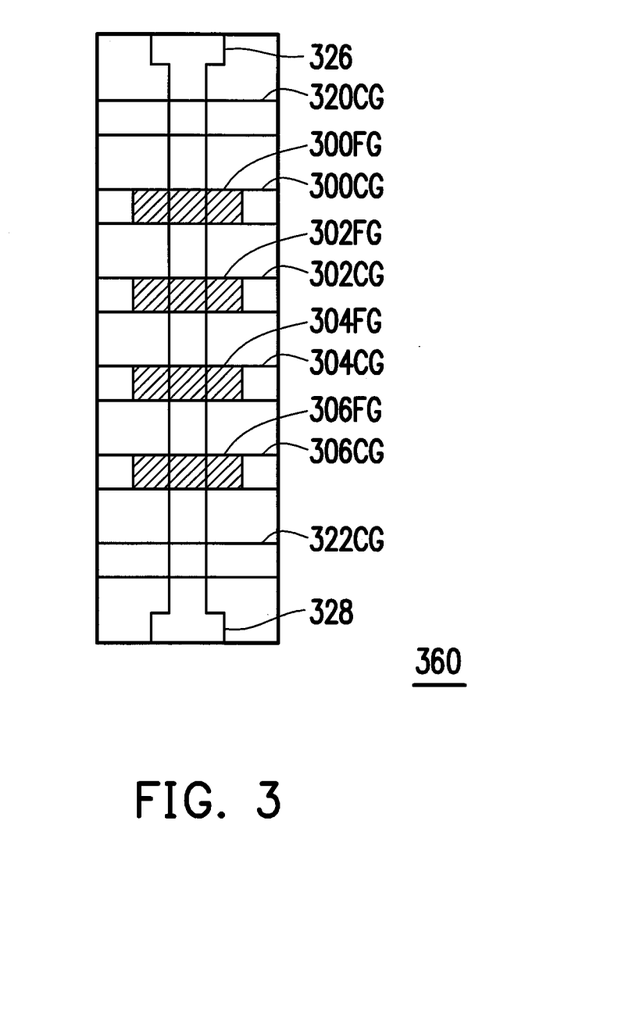
FIG. 3 illustrates a top view of a NAND string according to an exemplary embodiment.
Figure 4:
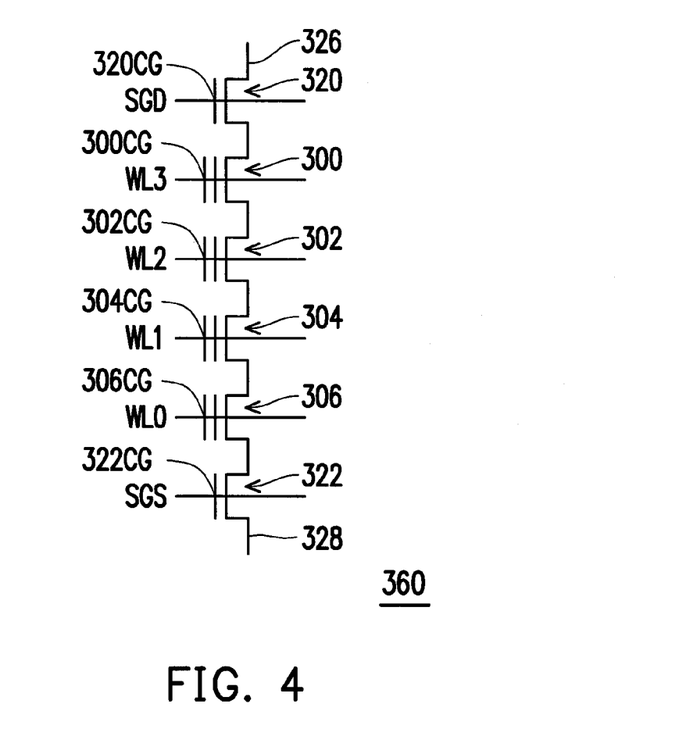
FIG. 4 illustrates an equivalent circuit diagram of a NAND string according to an exemplary embodiment.

FIG. 3 illustrates a top view of a NAND string according to an exemplary embodiment. FIG. 4 illustrates an equivalent circuit diagram of a NAND string according to an exemplary embodiment.

Referring to FIG. 3 and FIG. 4, a NAND string 360 includes transistors 320, 300, 302, 304, 306 and 322. A circuit between a contact point 236 and a contact point 328 is known as a bit line. A control gate 320CG on the transistor 320 is coupled to a select line SGD; a control gate 300CG on the transistor 300 is coupled to a word line WL3; a control gate 302CG on the transistor 302 is coupled to a word line WL2; a control gate 304CG on the transistor 304 is coupled to a word line WL1; a control gate 306G on the transistor 306 is coupled to a word line WL0; and a control gate 322CG on the transistor 322 is coupled to a select line SGS. Each of the transistors 300, 302, 304 and 306 further includes a charge-trapping layer. The charge-trapping layer is configured to store electrons or electron holes. In the present exemplary embodiment, the charge trapping layer is known as a floating gate, and a material thereof includes a doped poly-silicon. However, in another exemplary embodiment, the charge trapping layer may include a silicon oxide-silicon nitride-silicon oxide composite layer, or other materials capable of storing the electrons or electron holes, and the invention is not limited thereto. In the exemplary embodiment of FIG. 3, the transistor 300 includes a floating gate 300FG; the transistor 302 includes a floating gate 302FG; the transistor 304 includes a floating gate 304FG; and the transistor 306 includes a floating gate 306FG. Herein, the transistors 300, 302, 304 and 306 may also be referred to as memory cells.

Figure 5:
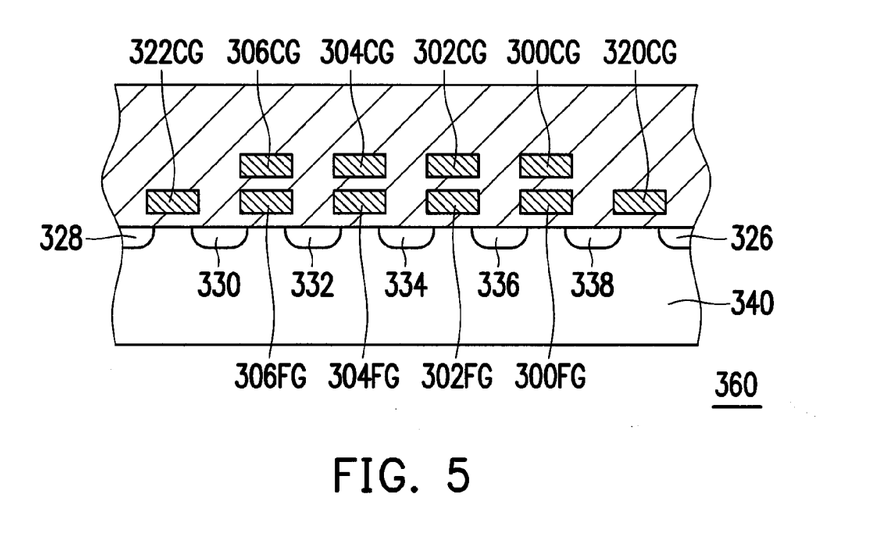
FIG. 5 illustrates a side view of a NAND string according to an exemplary embodiment.

FIG. 5 illustrates a side view of a NAND string according to an exemplary embodiment. Referring to FIG. 3 to FIG. 5, the NAND string 360 is disposed on a substrate 340. The control gates 300CG, 302CG, 304CG and 306CG are disposed on the floating gates 300FG, 302FG, 304FG and 306FG, respectively. A dielectric layer is disposed between the control gates 300CG, 302CG, 304CG, 306CG and the floating gates 300FG, 302FG, 304FG, 306FG. An oxidation layer is disposed between the floating gates 300FG, 302FG, 304FG, 306FG and the substrate 340. Doped poly-silicon layers 330, 332, 334, 336 and 338 may be shared by the adjacent transistors in FIG. 5, and a source or a drain of one transistor may be formed by one of the doped poly-silicon layers. In case data is written (i.e., programmed) into the transistors 300, 302, 304 and 306, a suitable voltage may be applied to the control gates 320CG and 322CG, so that the transistors 320 and 322 may be turned on; and a current is generated between the contact point 326 and the contact point 328. A writing voltage will be applied to the control gate on the transistor to be programmed. Herein, take the control gate 302CG as an example, in which the electrons or electron holes will be moved to the floating gate 302FG. When the electrons or electron holes are injected into the floating gate 302FG, a threshold voltage of the transistor 302 is changed for equivalently storing one or more bits. It should be note that, in other exemplary embodiments, the NAND string 360 may also include more of the memory cells, and a number of the memory cells in one NAND string is not particularly limited in the invention. Moreover, FIG. 3 to FIG. 5 are merely an example, and a coupling relation between structures or circuits of the memory cells in the rewritable non-volatile memory module 106 is not particularly limited in the invention. For instance, in an exemplary embodiment, a plurality of memory cells are stacked over one another thereby forming a flash memory in three dimension.

Figure 6:
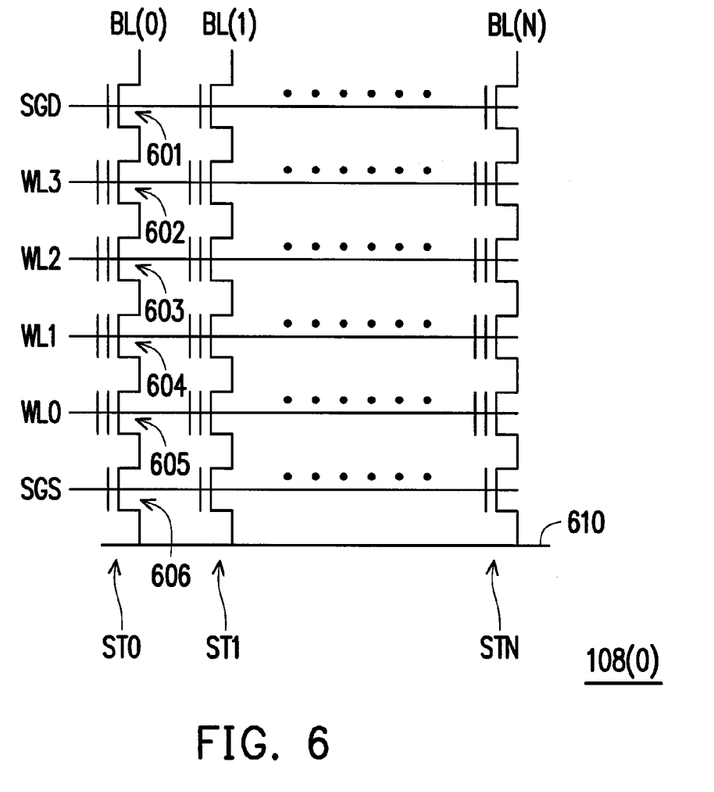
FIG. 6 illustrates a physical erasing unit according to an exemplary embodiment.

FIG. 6 illustrates a physical erasing unit according to an exemplary embodiment.

Referring to FIG. 6, take a physical erasing unit 108(0) in the memory cell array 2202 as an example, the physical erasing unit 108(0) includes a plurality of NAND strings ST0 to STN. The NAND string ST0 includes transistors 601, 606 and memory cells 602 to 605. The NAND strings ST0 to STN are similar to the NAND string 360 depicted in FIG. 4, thus related description is omitted hereinafter. The physical erasing unit 108(0) also includes a plurality of word lines WL0 to WL3 and a plurality of bit lines BL(0) to BL(N). Each of the memory cells in the physical erasing unit 108(8) is disposed on one word line and one bit line. The memory cells on the same word line may form one or more physical programming units. More specifically, in case each of the memory cells is capable of storing x bits, at least x physical programming units may be formed by the memory cells on the same word line, in which x is a positive integer. In case the positive integer is greater than 1, the x physical programming units on the same word line may also be classified into a lower physical programming unit and an upper physical programming unit. However, a value of the positive integer x is not particularly limited in the invention. Generally, a writing speed of the lower physical programming unit is faster than a writing speed of the upper physical programming unit. In the present exemplary embodiment, the physical programming unit is a minimum unit for programming. That is, the physical programming unit is the minimum unit for writing data. For example, the physical programming unit is a physical page or a physical sector. In case the physical programming unit is the physical page, each physical programming unit usually includes a data bit area and a redundant bit area. The data bit area has multiple physical sectors configured to store user data, and the redundant bit area is configured to store system data (e.g., an error correcting code). In the present exemplary embodiment, each of the data bit areas contains 32 physical sectors, and a size of each physical sector is 512-byte (B). However, in other exemplary embodiments, the data bit area may also include 8, 16, or more or less of the physical sectors, and quantities and sizes of the physical sectors are not limited in the invention.

On the other hand, the NAND strings ST0 to STN are all coupled to a source line 610. When the physical erasing unit 108(0) is to be erased, an erase voltage may be applied to a basis of the physical erasing unit 108(0), so that the electrons or electron holes in all of the floating gates in the physical erasing unit 108(0) may leave the floating gates. In the present exemplary embodiment, the physical erasing unit is a minimum unit for erasing. Namely, each physical erasing unit contains the least number of memory cells to be erased together. For instance, the physical erasing unit is a physical block.

In the present exemplary embodiment, the rewritable non-volatile memory module 106 is a Single Level Cell (SLC) NAND flash memory module in which one memory cell is capable of storing one bit. However, the invention is not limited thereto. The rewritable non-volatile memory module 106 may also be a Multi Level Cell (MLC) NAND flash memory module, a Trinary Level Cell (TLC) NAND flash memory module, other flash memory modules or any memory module having the same features.

Figure 7:
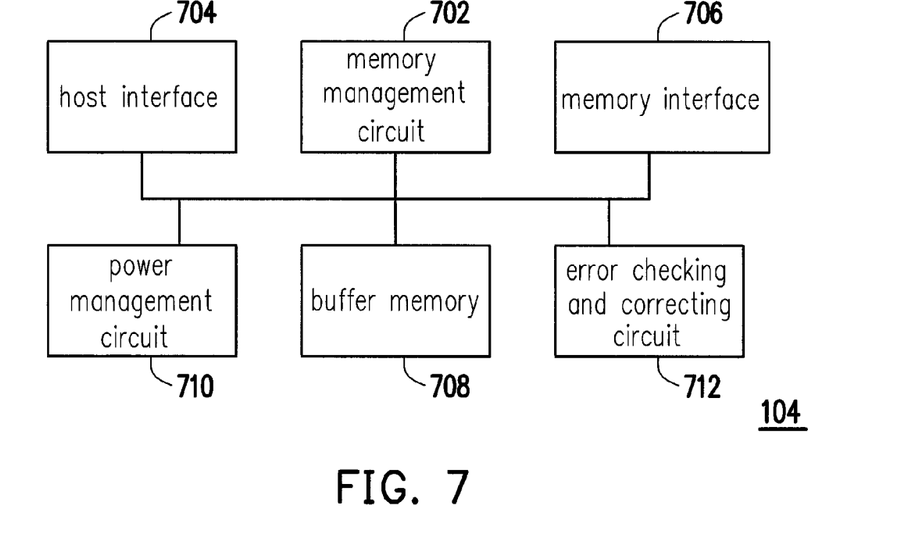
FIG. 7 is a schematic block diagram illustrating a memory controlling circuit unit according to an exemplary embodiment.

FIG. 7 is a schematic block diagram illustrating a memory controlling circuit unit according to an exemplary embodiment.

Referring to FIG. 7, the memory controlling circuit unit 104 includes a memory management circuit 702, a host interface 704 and a memory interface 706.

The memory management circuit 702 is configured to control overall operations of the memory controlling circuit unit 104. Specifically, the memory management circuit 702 has a plurality of control commands. When the memory storage device 100 is operated, the control commands are executed to perform various operations such as data writing, data reading and data erasing.

The host interface 704 is coupled to the memory management circuit 702 and configured to receive and identify commands and data sent from the host system 1000. Namely, the commands and data sent from the host system 1000 are passed to the memory management circuit 702 through the host interface 704. In the present exemplary embodiment, the host interface 704 is compatible to a SATA standard. However, it should be understood that the present invention is not limited thereto, and the host interface 704 may also be compatible with a PATA standard, an IEEE 1394 standard, a PCI Express standard, a USB standard, a SD standard, a UHS-I standard, a UHS-II standard, a MS standard, a MMC standard, a eMMC standard, a UFS standard, a CF standard, an IDE standard, or other suitable standards for data transmission.

The memory interface 706 is coupled to the memory management circuit 702 and configured to access the rewritable non-volatile memory module 106. That is, data to be written to the rewritable non-volatile memory module 106 is converted to a format acceptable to the rewritable non-volatile memory module 106 through the memory interface 706.

In an exemplary embodiment of the invention, the memory controlling circuit unit 104 further includes a buffer memory 708, a power management circuit 710 and an error checking and correcting circuit 712.

The buffer memory 708 is coupled to the memory management circuit 702 and configured to temporarily store data and commands from the host system 1000 or data from the rewritable non-volatile memory module 106.

The power management unit 710 is coupled to the memory management circuit 702 and configured to control a power of the memory storage device 100.

The error checking and correcting circuit 712 is coupled to the memory management circuit 702 and configured to execute an error checking and correcting procedure to ensure correctness of data. Specifically, when the memory management circuit 702 receives a write command from the host system 1000, the error checking and correcting circuit 712 generates an error correcting code (ECC code) for data corresponding to the write command, and the memory management circuit 702 writes data and the ECC code corresponding to the write command to the rewritable non-volatile memory module 106. Subsequently, when the memory management circuit 702 reads the data from the rewritable non-volatile memory module 106, the ECC code corresponding to the data is also read, and the error checking and correcting circuit 712 may execute the error checking and correcting procedure for the read data according to the ECC code.

Figure 8:
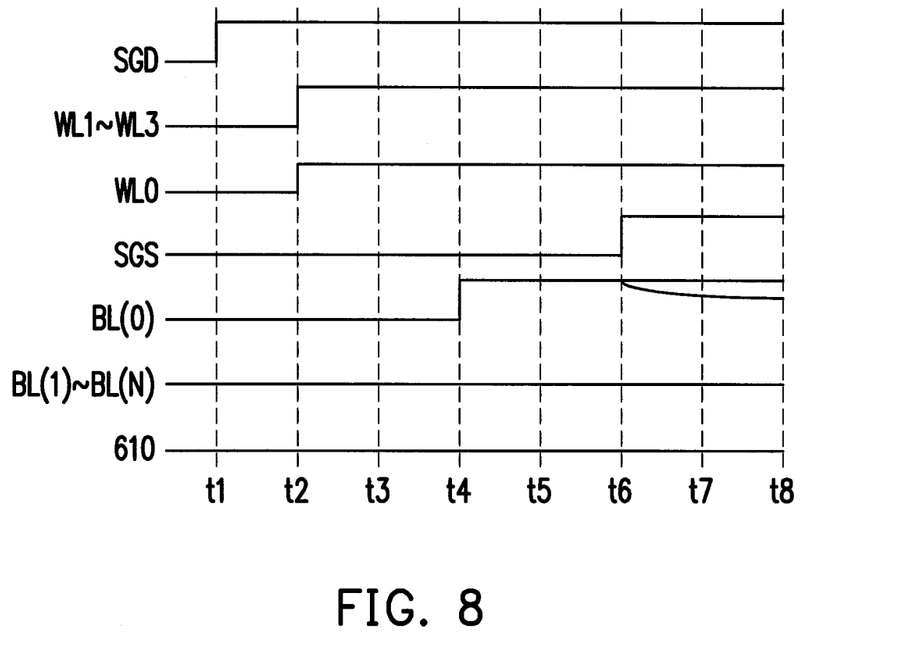
FIG. 8 illustrates a voltage timing diagram when reading a memory cell according to an exemplary embodiment.

FIG. 8 illustrates a voltage timing diagram when reading a memory cell according to an exemplary embodiment.

Referring to FIG. 6 and FIG. 8, it is assumed that the memory management circuit 702 transmitted a signal to the rewritable non-volatile memory module 106 for reading data in the memory cell 605. The rewritable non-volatile memory module 106 correspondingly changes voltage levels on the select lines SGD, SGS, the word lines WL0 to WL3, and the bit lines BL(0) to BL(N), so as to detect a state of the memory cell 605. More specifically, at an initial phase, all voltages in FIG. 8 are at low level. At a time point t1, the voltage level on the select line SGD is raised to turn on the transistor 601. At a time point t2, the voltage levels on the word lines WL1 to WL3 are raised to turn on the memory cells 602 to 604, and a read voltage is applied to the word line WL0. At a time point t4, the voltage level on the bit line BL(0) is raised to a pre-charge level. At a time point t6, the voltage level on the select line SGS is raised to turn on the transistor 606. A sensing current is generated on the bit line BL(0) in response to the read voltage on the memory cell 605. Based on a magnitude of the sensing current, the voltage level on the bit line BL(0) may be dropped. If the read voltage on the word line WL0 is greater than a threshold voltage of the memory cell 605, the memory cell 605 is turned on and the sensing current on the bit line BL(0) may drop the voltage level on the bit line BL(0). If the read voltage on the word line WL0 is not greater than the threshold voltage of the memory cell 605, the memory cell 605 is cut off and the voltage level on the bit line BL(0) maintains unchanged. Generally, the bit line BL(0) may be coupled to an amplifier for detecting the voltage level on the bit line BL(0). It should be noted that FIG. 8 is merely an example, and a time and an order for raising the voltage levels on the select lines SGD, SGS, the word lines WL0 to WL3, and the bit lines BL(0) to BL(N) are not particularly limited in the invention.

In an exemplary embodiment, the memory management circuit 702 writes data into at least one memory cell of the memory cell array 2022. Then, the memory management circuit 702 reads the memory cell written with the data repeatedly according to a read voltage (hereinafter, collectively referred to as a first read voltage) to obtain a plurality of sensing currents. In case the data is written into one memory cell, the memory management circuit 702 may first read such memory cell according to the first read voltage to obtain one sensing current (hereinafter, collectively referred to as a first sensing current) corresponding to such memory cell. Then, the memory management circuit 702 reads such memory cell repeatedly according to the first read voltage to obtain another sensing current (hereinafter, collectively referred to as a second sensing current) corresponding to such memory cell, and the rest may be deduced by analogy until the memory management circuit 702 has obtained a sufficient amount of the sensing currents. Furthermore, in an exemplary embodiment, the memory management circuit 702 also sets the first read voltage according to a read voltage that is predetermined (hereinafter, collectively referred to as a predetermined read voltage). For instance, the memory management circuit 702 sets the first read voltage to be at a voltage point deviated from the predetermined read voltage, such that a difference between any two of a plurality of sensing currents obtained by the memory management circuit 702 reading the memory cell repeatedly according to the predetermined read voltage is less than a difference between any two of a plurality of sensing currents obtained by the memory management circuit 702 reading the memory cell repeatedly according to the first read voltage. In other words, with respect to the read voltage set to the predetermined read voltage (to be at the voltage point for reading stably), the memory management circuit 702 can have greater chance in obtaining the sensing currents with greater differences in each read by using the first read voltage.

Then, the memory management circuit 702 generates a random number according to a part or all of the sensing currents. For instance, the memory management circuit 702 may directly use values of the sensing currents as the random number, or may perform a simply arrangement or calculations (e.g., addition, subtraction, multiplication, division, etc.) on the values of the sensing currents to generate the random number, and the invention is not limited thereto. Furthermore, the memory management circuit 702 may first convert the value of each sensing current into binary value, decimal value or hexadecimal value first and then perform various logic calculations including OR, XOR, AND and NAND on the converted value, so as to generate the random number. In addition, the memory management circuit 702 may also generate the random number with reference to a random number generation algorithm.

While reading the data in the memory cell 605, because all of the transistors 601, 606 and the memory cells 602 to 604 are turned on, the voltages applied on the select lines SGD, SGS and the word lines WL1 to WL3 may all be known as a turn on voltage. When the turn on voltage of at least one of the transistors 601, 606 and the memory cells 602 to 604 changes, the sensing currents corresponding to the read voltage for the memory cell 600 may also be changed. Therefore, in an exemplary embodiment, before reading said memory cell repeatedly, the memory management circuit 702 may further adjust the turn on voltages of other memory cells on the same bit line to which such memory cell belongs. Accordingly, when said memory cell is read by the memory management circuit 702 repeatedly, the memory management circuit 702 can have greater chance in obtaining the different sensing currents.

In addition, the memory management circuit 702 may also write the data into the memory cells of the memory cell array 2202, and sequentially read a first memory cell and a second memory cell among the memory cells according to the first read voltage to obtain the sensing currents until a sufficient amount of the sensing currents is obtained or all of the memory cell written with the data have been read. Accordingly, the memory management circuit 702 may also obtain the sensing currents which are different from one another, so that the random number may be generated according to said sensing currents.

Referring back to FIG. 8, in the exemplary embodiment of FIG. 8, the voltage level on the bit line BL(0) or the sensing currents corresponding to the memory cell 605 may be used to determine whether the memory cell 605 is turned on or cut off, and the rewritable non-volatile memory module 106 may generate a verification bit correspondingly. For instance the verification bit "1" indicates "cut off", and the verification bit "0" indicates "turned on". However, it should be noted that, with increases in the read voltage, practically, the memory cell 605 may not be suddenly changed from "cut off" to "turned on". Therefore, in another exemplary embodiment, the verification bit does not necessarily represent the states of cut off or turned on.

Figure 9:
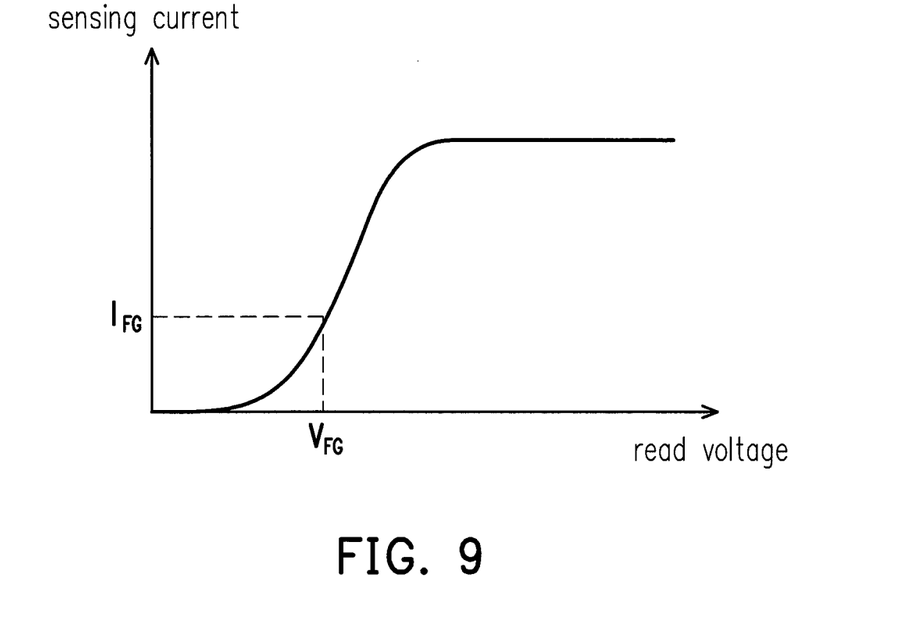
FIG. 9 is a curve diagram illustrating a relation between the read voltage and the sensing current according to an exemplary embodiment.

FIG. 9 is a curve diagram illustrating a relation between the read voltage and the sensing current according to an exemplary embodiment. As shown in FIG. 9, with increases in the read voltage, the sensing current are gradually increased. Therefore, in an exemplary embodiment, the rewritable non-volatile memory module 106 may set the verification bit to "1" when the sensing current is greater than a first threshold, and set the verification bit to "0" when the sensing current is less than a second threshold. The first threshold and the second threshold may be identical or different, and the invention is not limited thereto. From another perspective, the verification bit may be used to indicate whether the threshold voltage of the memory cell 605 is greater than the read voltage being applied. For instance, in FIG. 9, if the sensing current is greater than a current value $I_{FG}$, it indicates that the read voltage is greater than a threshold voltage $V_{FG}$ and the verification bit is "1". However, since the sensing current is increased gradually, values of the threshold voltage $V_{FG}$ may vary based on different determining methods. The determining methods of the threshold voltage in the memory cell are not particularly limited in the invention. In the present exemplary embodiment, the verification bit may be decided according to magnitude, variation or any other electrical properties of the sensing current, or may be decided based on the voltage level on the bit line, but the invention is not limited to the deciding methods above. The rewritable non-volatile memory module 106 may transmit the obtained verification bit to the memory management circuit 702.

Therefore, in an exemplary embodiment, after the at least one memory cell is read according to the first read voltage and the sensing currents are obtained, the memory management circuit 702 may obtain a plurality of verification bits corresponding to the sensing currents. Then, the memory management circuit 702 generates the random number according to the verification bits.

Figure 10:
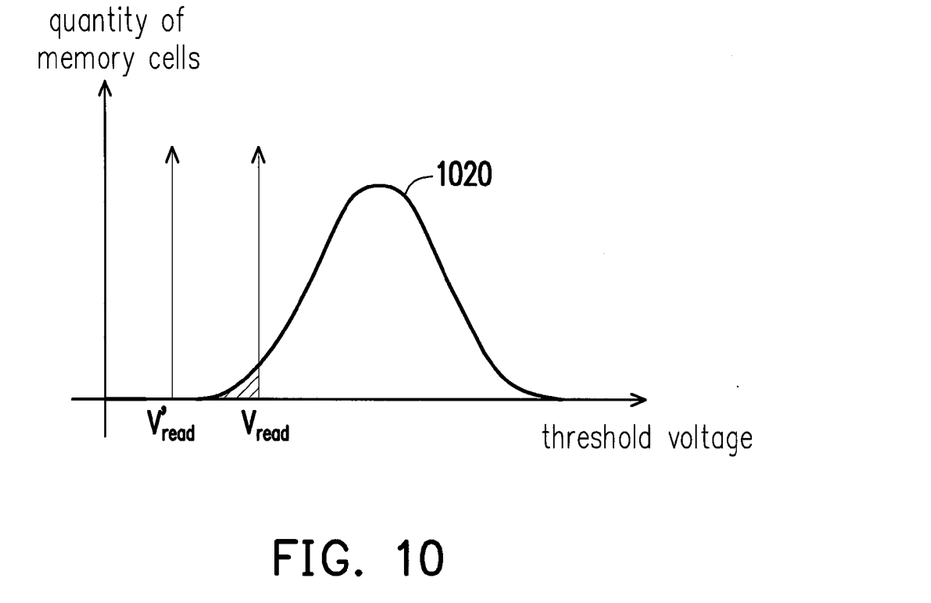
FIG. 10 is a threshold voltage distribution diagram after writing data into the memory cells.

FIG. 10 is a threshold voltage distribution diagram after writing data into the memory cells.

The memory management circuit 702 first writes data into a plurality of memory cells of the memory cell array 2022. The memory cells may belong to the same physical erasing unit or different physical erasing units (e.g., the same physical block or different physical blocks). In addition, the memory cells may also belong to the same physical programming unit or different physical programming units (e.g., the same physical page or different physical pages), and the invention is not limited thereto.

As shown in FIG. 10, the horizontal axis represents the threshold voltage, and the vertical axis represents a quantity of the memory cells. A quantity of the memory cells for writing the data is not limited by the invention. In the present exemplary embodiment, the data is of the same bit (e.g., "0"). In an exemplary embodiment, the data may also be generated randomly or by using other methods. Further, in another exemplary embodiment, the data may also be a real time write data from the host system 1000, and the content of the data is not particularly limited by the invention.

Referring to FIG. 10, after the data is written into the memory cells, a threshold voltage distribution of the memory cells written with the data is as shown by a curve 1020. In the present exemplary embodiment, the memory management circuit 702 reads the memory cell according to a first read voltage $V_{read}$ to obtain a plurality of sensing currents corresponding to the memory cells and obtain a verification bit corresponding to each of the sensing currents. The memory management circuit 702 determines whether each of the verification bits obtained belongs to a first state or a second state.

In the present exemplary embodiment, the first state and the second state of the verification bit respectively indicate whether the read voltage being applied is greater than a threshold voltage of the memory cell. When the read voltage being applied is greater than the threshold voltage of the memory cell (e.g., a slash region in the curve 1020), the verification bit corresponding to the memory cell includes a first value, and the first value is, for example, "1". When the read voltage being applied is less than or equal to the threshold voltage of the memory cell, the verification bit corresponding to the memory cell includes a second value, and the second value is, for example, "0". The memory management circuit 702 may determine the verification bit having the first value as the verification bit belonging to the first state, and determine the verification bit having the second value as the verification bit belonging to the second state. In other words, in the present exemplary embodiment, a quantity of the verification bits belonging to the first state is identical to a quantity of the memory cells with the threshold voltage less than the first read voltage $V_{read}$. Then, the memory management circuit 702 counts the quantity of the verification bits belonging to the first state (hereinafter, collectively referred to as a first quantity).

However, the invention is not intended to limit meanings of the first state and the second state only to the above. For instance, in another exemplary embodiment, the first state and the second state may represent whether the data of the verification bit is correct. In other words, in case the data in one verification bit is incorrect, such data belongs to the first state; and in case the data in one verification bit is correct, such data belongs to the second state. In the present exemplary embodiment, after the verification bits corresponding to the sensing currents are obtained, the error checking and correcting circuit 712 performs the error checking and correcting procedure according to an error correcting code of the data to obtain a plurality of error bits in the verification bits. In case the data is 6 bits, when the data is "000000", if the verification bits corresponding to the sensing currents are "010110", it indicates that the verification bits include 3 error bits which are incorrectly identified as "1" (i.e., second, fourth and fifth bits). The memory management circuit 702 may determine the error bits as the verification bits belonging to the first state, and set a quantity of the error bits to said first quantity. On the other hand, other bits in the verification bits not belonging to the error bits (i.e., first, third and sixth bits) are the verification bits belonging to the second state.

Generally, the memory management circuit 702 reads the memory cells in the rewritable non-volatile memory module 106 according to the predetermined read voltage. However, with increases in usage time of the rewritable non-volatile memory module 106, the threshold voltages of the memory cells in the rewritable non-volatile memory module 106 will drop. Therefore, the predetermined read voltage is often adaptively adjusted with increases in usage time of the rewritable non-volatile memory module 106, so that a correctness of the verification bits obtained by the memory management circuit 702 according to the predetermined read voltage can be higher.

In an exemplary embodiment, the memory management circuit 702 reads said memory cells according to the predetermined read voltage. However, it is highly possible that a sufficient number of the error bits cannot be obtained because the correctness in reading the memory cells according to the predetermined read voltage is overly high. Therefore, in the present exemplary embodiment, the memory management circuit 702 sets the first read voltage $V_{read}$ to be at the voltage point which is more unstable or prone to errors with respect to the predetermined read voltage, such that the correctness of the verification bits obtained by the memory management circuit 702 according to the first read voltage $V_{read}$ may be lowered for obtaining more of the error bits. In other words, in case the quantity of the error bits generated by reading the memory cells by the memory management circuit 702 according to the predetermined read voltage is referred to as an initial quantity, the quantity of the error bits (i.e., the first quantity) generated by the memory management circuit 702 according to the first read voltage $V_{read}$ is greater than the initial quantity. In addition, by setting the first read voltage $V_{read}$ at the voltage point which is more unstable or prone to errors with respect to the predetermined read voltage, a difference between amount of the error bits obtained each time may also be increased, so that the error bits with the same amount are less likely to be obtained twice or more than twice in a row.

In the exemplary embodiment of FIG. 10, it is assumed that the predetermined read voltage is $V'_{read}$, the memory management circuit 702 may then set the first read voltage $V_{read}$ to be at the voltage point which is more unstable or prone to errors with respect to the predetermined read voltage $V'_{read}$. For instance, the memory management circuit 702 may increase the predetermined read voltage $V'_{read}$ by a predetermined value to obtain the first read voltage $V_{read}$. When the memory management circuit 702 reads the memory cells according to the first read voltage $V_{read}$, because the first read voltage $V_{read}$ is greater than the threshold voltages of some of the memory cells, some of the memory cells originally stored with the bit "0" (i.e., the slash region in the curve 1020) are incorrectly identified as being stored with the bit "1". The memory management circuit 702 counts the quantity of the verification bits corresponding to the memory cells incorrectly identified as being stored with the bit "1", so as to obtain the quantity of the verification bits belonging to the first state (i.e., the first quantity). Otherwise, when the memory management circuit 702 reads the memory cells according to the predetermined read voltage $V'_{read}$, all of the memory cells may be correctly identified as "0" in this case. In other words, by setting the first read voltage $V_{read}$ to operate at the voltage point which is respectively more unstable or prone to errors, the memory management circuit 702 may effectively obtain the error bits which are random and unpredictable, and consider the quantity of the error bits as said first quantity.

It should be noted that, despite that the first read voltage $V_{read}$ must be operated at the voltage point which is respectively unstable in order to obtain a proper quantity of the error bits, the quantity of the error bits may be restricted in an exemplary embodiment. For instance, in case the data being written is the write data from the host system 1000, if the error bits generated by reading said data cannot be correctly corrected, the data being read may be incorrect.

Therefore, in the present exemplary embodiment, a ratio value of the first quantity to a total quantity of all the verification bits corresponding to the memory cells is less than or equal to a predetermined ratio value. The predetermined ratio value is in a positive correlation with an error checking and correcting capability of the error checking and correcting procedure executed by the error checking and correcting circuit 712. When the error checking and correcting capability of the error checking and correcting procedure gets higher, the predetermined ratio value may be increased. When the error checking and correcting capability of the error checking and correcting procedure executed by the error checking and correcting circuit 712 gets lower, it is also required to decrease the predetermined ratio value. For instance, the predetermined ratio value may be 50/70, and the predetermined ratio value may be adjusted according to the error checking and correcting capability of the error checking and correcting circuit 712. In case the ratio value of the first quantity to the total quantity of all the verification bits is less than or equal to the predetermined ratio value, it indicates that a proportion of the error bits occupied in all the verification bits is still within a tolerable range. Therefore, all of the error bits in the verification bits may be located and corrected. Otherwise, if the ratio value is greater than the predetermined ratio value, it indicates that the proportion of the error bits occupied in all the verification bits is overly high. Therefore, it is possible that some of the error bits in the verification bits cannot be located and corrected.

As shown in FIG. 10, in case the first read voltage $V_{read}$ gets greater, or farther from the predetermined read voltage $V'_{read}$, the quantity of the error bits obtained by reading the memory cell according to the first read voltage $V_{read}$ is also increased. Accordingly, in the present exemplary embodiment, the first read voltage $V_{read}$ is set to be less than or equal to a read voltage upper limit, so as to avoid a condition where the proportion of the error bits occupied in all the verification bits obtained is overly high. For instance, the read voltage upper limit may be obtained through calculation according to the curve 1020 and an equation (1) below:

$$\frac{\int_{V1}^{V2} D(V)}{\int_{-\infty}^{\infty} D(V)} \leq CA \quad (1)$$

Therein, V1 is the predetermined read voltage; V2 is the read voltage upper limit; D(V) is an equation representing the curve 1020; V is the read voltage; and CA is the predetermined ratio value. In case V1, D(V) and CA are known, the read voltage upper limit V2 may be calculated by the memory management circuit 702 according to the equation (1).

After the first quantity is obtained, the memory management circuit 702 generates the random number according to the first quantity. For instance, the memory management circuit 702 may directly use a number code representing the first quantity as the random number, or use the number code representing the first quantity as a seed of a random number generator to be entered into the random number generator to generate the random number. The number code may be, for example, number codes in binary, decimal or hexadecimal, but the invention is not limited thereto. In addition, the memory management circuit 702 may also obtain a quantity of the verification bits belonging to the second state, and generate the random number according to the quantity of the verification bits belonging to the second state alone or together with the first quantity. Particularly, in an exemplary embodiment, in case one write data is received from the host system 1000 and such write data is written into the rewritable non-volatile memory module 106, the memory management circuit 702 may obtain the random number corresponding to such write data by using the method as introduced in the foregoing exemplary embodiments.

Furthermore, in an exemplary embodiment, the memory management circuit 702 generates the random number through a rule that is predetermined (also known as a predetermined rule). For instance, it is assumed that one random number is composed of N values, in which N is a positive number. The memory management circuit 702 first reads the memory cells according to the first read voltage, so as to obtain the sensing currents and the verification bits corresponding to the sensing currents. Then, the memory management circuit 702 counts the first quantity of the verification bits belonging to the first state. The first quantity is used to decide a first value among the N values of the random number. Then, the memory management circuit 702 determines whether the first quantity is sufficient for generating the random number. In the present exemplary embodiment, because (N−1) values are still required, the memory management circuit 702 may determine that the first quantity is insufficient for generating the random number. Meanwhile, the memory management circuit 702 again reads the memory cells or other memory cells according to the first read voltage again or a second read voltage different from the first read voltage, so as to obtain the sensing currents and the verification bits corresponding to the sensing currents and count the quantity of the verification bits belonging to the first state, again. For convenience of description, the quantities of the verification bits belonging to the first state being obtained after a second read are known as a second quantity. After the memory cells are repeatedly read by N times, the memory management circuit 702 obtains one first quantity and (N−1) second quantities. The (N−1) second quantities are used to decide the (N−1) values arranged after the first value among the N values in the random number. In this case, the memory management circuit 702 determines that the first quantity and the second quantities are sufficient for generating the desired random number. Then, the memory management circuit 702 generates the random number according to the first quantity and said (N−1) second quantities.

In case N=2, after one first quantity and one second quantity are obtained, the memory management circuit 702 may obtain a first number code representing the first quantity, and a second number code representing the second quantity. For instance, the first number code and the second number code are composed of at least one of binary value, decimal value or hexadecimal value, respectively. In one exemplary embodiment, the memory management circuit 702 may obtain a first value on a first position of the first number code, and obtain a second value on a second position of the second number code. Then, the memory management circuit 702 generates the random number according to the first value and the second value. Take hexadecimal value for example, it is assumed that the first quantity is 57 and the second quantity is 52. Accordingly, the first number code is "39" and the second number code is "34". The memory management circuit 702 may fetch a value on a $P^{th}$ position from the right in the first number code as the first value, and fetch a value on the $P^{th}$ position also from the right in the second number code as the second value. Therein, P is a positive integer. In case P=1, the first value is "9" and the second value is "4", and the memory management circuit 702 may generate the random number according to "9" and "4". For instance, the memory management circuit 702 may sequentially set "9" and "4" as two values of the random number, and the random number being generated is "94". In the present exemplary embodiment, the first position and the second position are identical. However, in another exemplary embodiment, the first position and the second position are different. For instance, in another exemplary embodiment, the memory management circuit 702 may fetch a value on the $P^{th}$ position from the right in the first number code as the first value, and fetch a value on a $Q^{th}$ position also from the right in the second number code as the second value. In case P=1 and Q=2, the first value is "9" and the second value is "3", and the random number being generated is "93". Furthermore, in another exemplary embodiment, the predetermined rule for generating the random number may also be done by performing various logic calculations including OR, XOR, AND and NAND on the first number code and the second number code, and the invention is not limited thereto. Accordingly, regardless of how a length or a format of the random number changes, the memory management circuit 702 is capable of adaptively generating the random number which is random and unpredictable.

Figure 11:
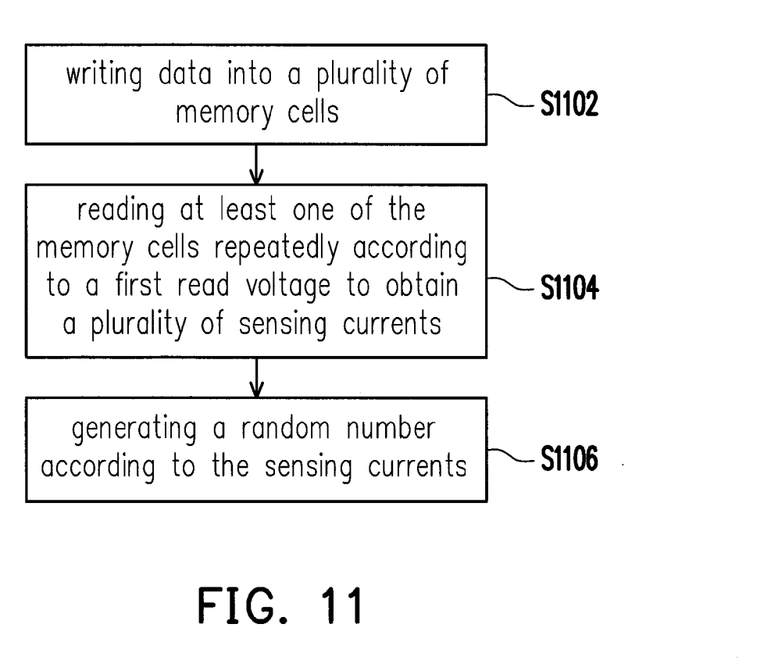
FIG. 11 is a flowchart illustrating a method for generating a random number according to an exemplary embodiment.

FIG. 11 is a flowchart illustrating a method for generating a random number according to an exemplary embodiment.

Referring to FIG. 11, in step S1102, the memory management circuit 702 writes data into a plurality of memory cells of the rewritable non-volatile memory module 106.

In step S1104, the memory management circuit 702 reads at least one of the memory cells repeatedly according to a first read voltage to obtain a plurality of corresponding sensing currents.

In step S1106, the memory management circuit 702 generates a random number according to said sensing currents.

Figure 12:
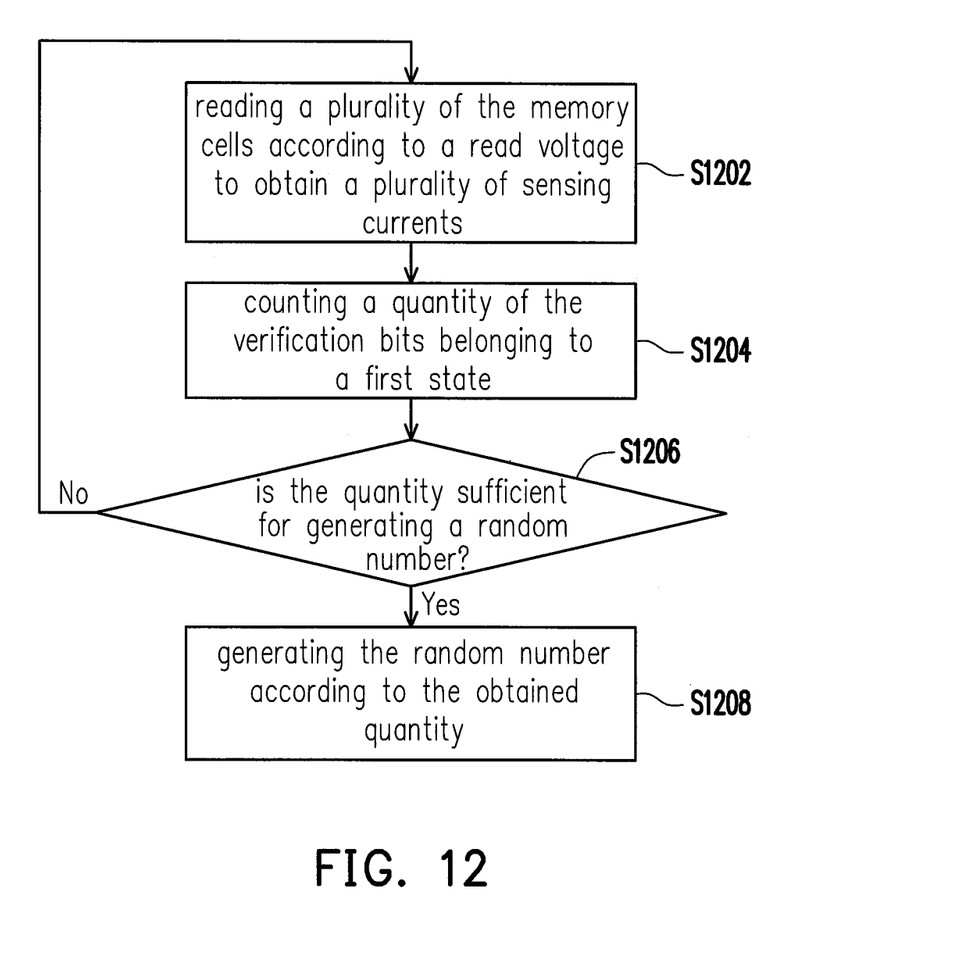
FIG. 12 is a flowchart illustrating a method for generating a random number according to another exemplary embodiment.

FIG. 12 is a flowchart illustrating a method for generating a random number according to another exemplary embodiment.

Referring to FIG. 12, in step S1202, the memory management circuit 702 reads a plurality of memory cells of the rewritable non-volatile memory module 106 according to a read voltage. The read voltage may be above-said first read voltage or a second read voltage different from the first read voltage.

In step S1204, the memory management circuit 702 counts a quantity of verification bits belonging to a first state. The quantity may be above-said first quantity or above-said second quantity.

In step S1206, the memory management circuit 702 determines whether the quantity is sufficient for generating the random number.

If the memory management circuit 702 determines that the quantity is sufficient for generating the random number, in step S1208, the memory management circuit 702 generates the random number according to the quantity obtained. Otherwise, if the memory management circuit 702 determines that the quantity is insufficient for generating the random number in step S1206, the memory management circuit 702 performs step S1202 to step S1206 repeatedly.

For instance, it assumed that the memory management circuit 702 generates the random number according to the N values, if the one first quantity and the (N−1) second quantities have been obtained by the memory management circuit 702, the memory management circuit 702 may determine that the one first quantity and the (N−1) second quantities are sufficient for generating the random number in step S1206, and step S1208 is executed successively after step S1206. However, if the memory management circuit 702 only obtains the one first quantity and the second quantities being less than (N−1), it indicates that at least one second quantity is still required for generating the random number. Therefore, in step S1206, the memory management circuit 702 determines that the one first quantity and the second quantities being less than (N−1) are insufficient for generating the random number, and step S1202 to step S1206 are performed repeatedly after step S1206 until the one first quantity and the (N−1) second quantities are obtained.

It should be noted that, the steps depicted in FIG. 11 and FIG. 12 may be implemented as a plurality of program codes or circuits, and the invention is not limited thereto. Moreover, the methods disclosed in FIG. 11 and FIG. 12 may be implemented with reference to above embodiments, or may be implemented separately, and the invention is not limited thereto.

It should be noted that, in the present exemplary embodiment, despite that the memory management circuit 202 is implemented inside the memory controlling circuit unit 104, the invention is not limited thereto. In another exemplary embodiment of the invention, the memory management circuit 202 may also be implemented inside the control circuit 2122 of the rewritable non-volatile memory module 106, and electrically connected to the memory cell array 2202 of the rewritable non-volatile memory module 106 through an interface.

Based on above, in the method for generating the random number, the memory storage device and the control circuit provided by the invention, the first read voltage which is more unstable with respect to the predetermined read voltage may be utilized to read one or more of the memory cells, so as to obtain the sensing currents corresponding to the first memory cells, and generate the random number according to the sensing current being obtained. Moreover, by using the method for generating the random number, the memory storage device and the control circuit provided by the invention, the verification bits corresponding to the sensing currents may be further obtained, and the random number may be generated according to the quantity of the verification bits belonging to the first state, such that the generated random number does not have regularity.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A method for generating a random number for a rewritable non-volatile memory module, wherein the rewritable non-volatile memory module comprises a plurality of memory cells, and the method for generating the random number comprises:

storing data received from a host system into the memory cells;

reading at least one of the memory cells repeatedly according to a first read voltage to obtain a plurality of sensing currents; and generating at least one random number according to the sensing currents.

2. The method for generating the random number of claim 1, wherein the step of reading the at least one of the memory cells repeatedly according to the first read voltage to obtain the sensing currents comprises:

setting the first read voltage according to a predetermined read voltage; and reading a first memory cell among the memory cells repeatedly according to the first read voltage to obtain a first sensing current and a second sensing current corresponding to the first memory cell among the sensing currents.

3. The method for generating the random number of claim 2, wherein a difference between any two of a plurality of sensing currents obtained by reading at least one of the memory cells repeatedly according to the predetermined read voltage is less than a difference between any two of a plurality of sensing currents obtained by reading at least one of the memory cells repeatedly according to the first read voltage.

4. The method for generating the random number of claim 1, wherein the step of reading the at least one of the memory cells repeatedly according to the first read voltage to obtain the sensing currents comprises:

adjusting a turn on voltage of at least one second memory cell among the memory cells belonging to an identical bit line to which a first memory cell among the memory cells belongs; and reading the first memory cell repeatedly according to the first read voltage to obtain a first sensing current and a second sensing current corresponding to the first memory cell.

5. The method for generating the random number of claim 1, wherein the step of generating the at least one random number according to the sensing currents comprises:

obtaining a plurality of verification bits corresponding to the sensing currents, and determining whether each of the verification bits belongs to a first states or a second state;

counting a first quantity of the verification bits belonging to the first state; and generating the at least one random number according to the first quantity.

6. The method for generating the random number of claim 5, wherein the step of determining whether each of the verification bits belongs to the first states or the second state comprises:

determining the verification bit having a first value as the verification bits belonging to the first state; and determining the verification bit having a second value as the verification bits belonging to the second state, wherein the first value and the second value are different.

7. The method for generating the random number of claim 5, wherein the step of determining whether each of the verification bits belongs to the first states or the second state comprises:

performing an error checking and correcting procedure according to an error correcting code of the data to obtain a plurality of error bits in the verification bits; and determining the error bits as the verification bits belonging to the first state.

8. A memory storage device, comprising:

a connection interface unit configured to couple to a host system;

a rewritable non-volatile memory module comprising a plurality of memory cells; and a memory controlling circuit unit coupled to the connection interface unit and the rewritable non-volatile memory module, wherein the memory controlling circuit unit is configured to store data from the host system into the memory cells, the memory controlling circuit unit is further configured to read at least one of the memory cells repeatedly according to a first read voltage to obtain a plurality of sensing currents, and the memory controlling circuit unit is further configured to generate at least one random number according to the sensing currents.

9. The memory storage device of claim 8, wherein the operation of the memory controlling circuit unit reading the at least one of the memory cells repeatedly according to the first read voltage to obtain the sensing currents comprises:

setting the first read voltage according to a predetermined read voltage; and reading a first memory cell among the memory cells repeatedly according to the first read voltage to obtain a first sensing current and a second sensing current corresponding to the first memory cell among the sensing currents.

10. The memory storage device of claim 9, wherein a difference between any two of a plurality of sensing currents obtained by reading at least one of the memory cells repeatedly according to the predetermined read voltage is less than a difference between any two of a plurality of sensing currents obtained by reading at least one of the memory cells repeatedly according to the first read voltage.

11. The memory storage device of claim 8, wherein the operation of the memory controlling circuit unit reading the at least one of the memory cells repeatedly according to the first read voltage to obtain the sensing currents comprises:

adjusting a turn on voltage of at least one second memory cell among the memory cells belonging to an identical bit line to which a first memory cell among the memory cells belongs; and reading the first memory cell repeatedly according to the first read voltage to obtain a first sensing current and a second sensing current corresponding to the first memory cell.

12. The memory storage device of claim 8, wherein the operation of the memory controlling circuit unit generating the at least one random number according to the sensing currents comprises:

obtaining a plurality of verification bits corresponding to the sensing currents, and determining whether each of the verification bits belongs to a first states or a second state;

counting a first quantity of the verification bits belonging to the first state; and generating the at least one random number according to the first quantity.

13. The memory storage device of claim 12, wherein the operation of the memory controlling circuit unit determining whether each of the verification bits belongs to the first states or the second state comprises:

determining the verification bit having a first value as the verification bits belonging to the first state; and determining the verification bit having a second value as the verification bits belonging to the second state, wherein the first value and the second value are different.

14. The memory storage device of claim 12, wherein the operation of the memory controlling circuit unit determining whether each of the verification bits belongs to the first states or the second state comprises:

performing an error checking and correcting procedure according to an error correcting code of the data to obtain a plurality of error bits in the verification bits; and determining the error bits as the verification bits belonging to the first state.

15. A control circuit, configured to control a rewritable non-volatile memory module, the rewritable non-volatile memory module comprising a plurality of memory cells, and the control circuit comprising:

an interface, configured to electrically connect with the memory cells, a plurality of word line and a plurality of bit lines, wherein each of the memory cells is electrically connected to one word line among the word lines and one bit line among the bit lines; and a memory management circuit, coupled to the interface, and configured to store data received from a host system into the memory cells, wherein the memory management circuit is further configured to read at least one of the memory cells repeatedly according to a first read voltage to obtain a plurality of sensing currents, and the memory management circuit is further configured to generate at least one random number according to the sensing currents.

16. The control circuit of claim 15, wherein the operation of the memory management circuit reading the at least one of the memory cells repeatedly according to the first read voltage to obtain the sensing currents comprises:

setting the first read voltage according to a predetermined read voltage; and reading a first memory cell among the memory cells repeatedly according to the first read voltage to obtain a first sensing current and a second sensing current corresponding to the first memory cell among the sensing currents.

17. The control circuit of claim 16, wherein a difference between any two of a plurality of sensing currents obtained by reading at least one of the memory cells repeatedly according to the predetermined read voltage is less than a difference between any two of a plurality of sensing currents obtained by reading at least one of the memory cells repeatedly according to the first read voltage.

18. The control circuit of claim 15, wherein the operation of the memory management circuit reading the at least one of the memory cells repeatedly according to the first read voltage to obtain the sensing currents comprises:

adjusting a turn on voltage of at least one second memory cell among the memory cells belonging to an identical bit line to which a first memory cell among the memory cells belongs; and reading the first memory cell repeatedly according to the first read voltage to obtain a first sensing current and a second sensing current corresponding to the first memory cell.

19. The control circuit of claim 15, wherein the operation of the memory management circuit generating the at least one random number according to the sensing currents comprises:

obtaining a plurality of verification bits corresponding to the sensing currents, and determining whether each of the verification bits belongs to a first states or a second state;

counting a first quantity of the verification bits belonging to the first state; and generating the at least one random number according to the first quantity.

20. The control circuit of claim 19, wherein the operation of the memory management circuit determining whether each of the verification bits belongs to the first states or the second state comprises:

determining the verification bit having a first value as the verification bits belonging to the first state; and determining the verification bit having a second value as the verification bits belonging to the second state, wherein the first value and the second value are different.

21. The control circuit of claim 19, wherein the operation of the memory management circuit determining whether each of the verification bits belongs to the first states or the second state comprises:

performing an error checking and correcting procedure according to an error correcting code of the data to obtain a plurality of error bits in the verification bits; and determining the error bits as the verification bits belonging to the first state.

* * * * *